United States Patent
Katami et al.

(12) 
(10) Patent No.: US 11,674,660 B2
(45) Date of Patent: Jun. 13, 2023

(54) VEHICLE HEADLAMP DEVICE

(71) Applicant: SUBARU CORPORATION, Tokyo (JP)

(72) Inventors: Kenshin Katami, Tokyo (JP); Shunichi Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/826,717

(22) Filed: May 27, 2022

(65) Prior Publication Data

US 2022/0397253 A1    Dec. 15, 2022

(30) Foreign Application Priority Data

Jun. 11, 2021 (JP) .............................. JP2021-097975

(51) Int. Cl.
| | |
|---|---|
| *F21S 41/60* | (2018.01) |
| *F21S 41/33* | (2018.01) |
| *F21S 41/25* | (2018.01) |
| *F21S 41/141* | (2018.01) |

(52) U.S. Cl.
CPC ............. *F21S 41/60* (2018.01); *F21S 41/141* (2018.01); *F21S 41/25* (2018.01); *F21S 41/33* (2018.01)

(58) Field of Classification Search
None
See application file for complete search history.

(56) References Cited

U.S. PATENT DOCUMENTS

2017/0028903 A1*    2/2017   Mochizuki ............... B60Q 1/14

FOREIGN PATENT DOCUMENTS

JP         2007-190986 A       8/2007

* cited by examiner

*Primary Examiner* — Elmito Breval
(74) *Attorney, Agent, or Firm* — McGinn I.P. Law Group PLLC.

(57) ABSTRACT

A vehicle headlamp device to be applied to a vehicle includes a light source, a lens, and a controller. The light source is configured to emit light. Light emitted from the light source is to pass through the lens. The controller is configured to control light distribution patterns for the light. The light distribution patterns include at least a first light distribution pattern and a second light distribution pattern. The first light distribution pattern illuminates an area ahead of the vehicle during running of the vehicle. The second light distribution pattern is projected as a marking at an optical axis adjustment that is performed during manufacturing of the vehicle. The controller causes a part of the light source to emit light so that the second light distribution pattern is formed.

8 Claims, 4 Drawing Sheets

VEHICLE HEADLAMP DEVICE

CROSS-REFERENCE TO RELATED APPLICATIONS

The present application claims priority from Japanese Patent Application No. 2021-097975 filed on Jun. 11, 2021, the entire contents of which are hereby incorporated by reference.

BACKGROUND

The disclosure relates to a vehicle headlamp device, and in particular, relates to a vehicle headlamp device that has an inspection light distribution pattern for optical axis adjustment during vehicle manufacturing and that eliminates inconvenience for a driver by obscuring a light-dark boundary caused by a cut line of a low beam during running of a vehicle.

As an example of an aiming adjustment method for a vehicle lamp in the related art, a method using a low-beam light distribution pattern has been known. A low-beam lamp has a desired light distribution pattern in which an optical axis is directed downward so as not to dazzle an oncoming vehicle. In a case of left hand traffic such as in Japan, the low-beam light distribution pattern has a horizontal cut line in a right region and a cut line inclined toward the upper left in a left region.

An intersection of the horizontal cut line and the oblique cut line is called an elbow point, and it is assumed that the elbow point is a center of the light distribution pattern. In headlight test, it is determined whether the optical axis of the low-beam lamp is oriented in a defined direction by detecting whether the elbow point is within a predetermined range (see, for example, Japanese Unexamined Patent Application Publication No. 2007-190986).

SUMMARY

An aspect of the disclosure provides a vehicle headlamp device to be applied to a vehicle. The vehicle headlamp device includes a light source, a lens, and a controller. The light source is configured to emit light. Light emitted from the light source is to pass through the lens. The controller is configured to control light distribution patterns for the light. The light distribution patterns include at least a first light distribution pattern and a second light distribution pattern. The first light distribution pattern illuminates an area ahead of the vehicle during running of the vehicle. The second light distribution pattern is projected as a marking at an optical axis adjustment that is performed during manufacturing of the vehicle. The controller causes a part of the light source to emit light so that the second light distribution pattern is formed.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
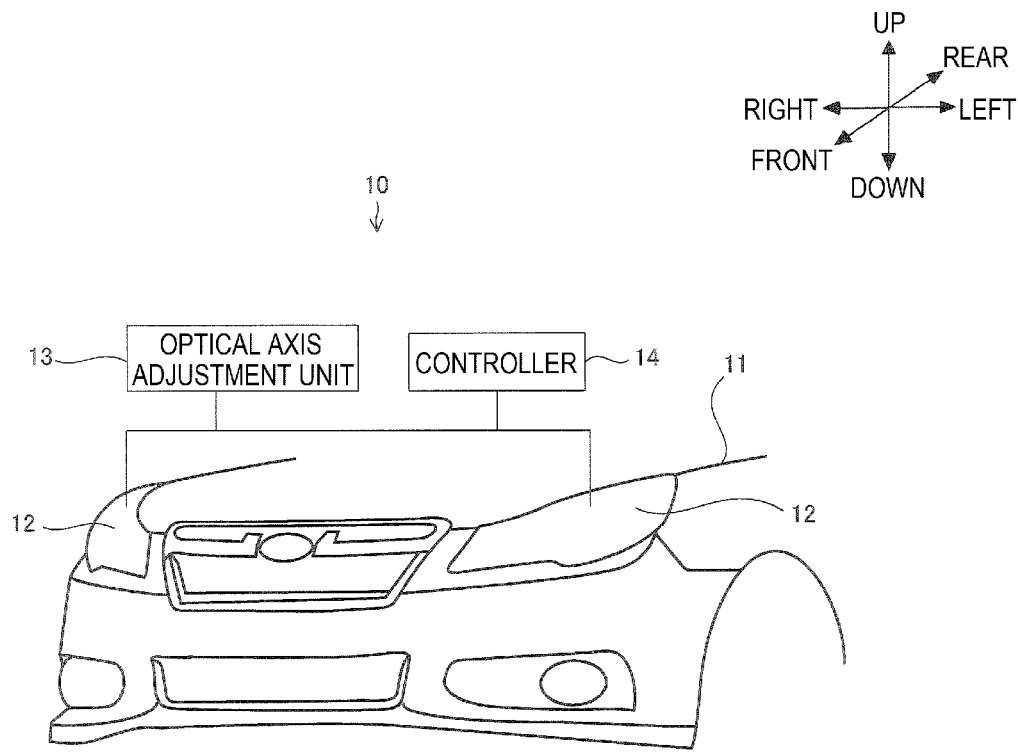
FIG. 1 is a block diagram illustrating a vehicle headlamp device according to an embodiment of the disclosure.

An aiming adjustment method for a vehicle lamp in the related art detects whether an elbow point is within a predetermined range. To this end, a light-dark boundary generated by the horizontal cut line and inclined cut line of the low-beam light distribution pattern is highlighted, so that the elbow point is made clear and the accuracy of the determination is improved. That is, the aiming adjustment method for a vehicle lamp in the related art highlights the light-dark boundary, which is generated by the cut lines of the low-beam light distribution pattern.

However, when the light-dark boundary generated by the cut lines is highlighted, the following situation may occur. If a road surface or a preceding vehicle is illuminated with light of the low-beam light distribution pattern during normal running of a vehicle, the light-dark boundary generated by the cut lines is too clearly visible to a driver, so that it becomes difficult for the driver to look ahead of the vehicle, which is inconvenient for the driver.

In particular, immediately before a running vehicle approaches a climbing lane on a slope, more light of the low-beam light distribution pattern is projected on a road surface than a down lane or a flat lane, and the light-dark boundary is too clearly visible to the driver. Thus, it becomes difficult for the driver to look ahead of the vehicle, and the driver is likely to feel uneasy.

Since a blurred region of the light of the low-beam light distribution pattern is reduced, an illuminated region of the road surface during the normal running of the vehicle is reduced, which deteriorates the field of vision of the driver.

It is desirable to provide a vehicle headlamp device that has an inspection light distribution pattern for optical axis adjustment during vehicle manufacturing and that eliminates inconvenience for a driver by obscuring a light-dark boundary caused by a cut line of a low beam during running of a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First, a vehicle headlamp device 10 according to the embodiment of the disclosure will be described in detail with reference to the accompanying drawings. In the following description, an up-down direction represents a height direction of a vehicle 11, a left-right direction represents a vehicle width direction of the vehicle 11, and a front-rear direction represents a longitudinal direction of the vehicle 11.

Figure 2:
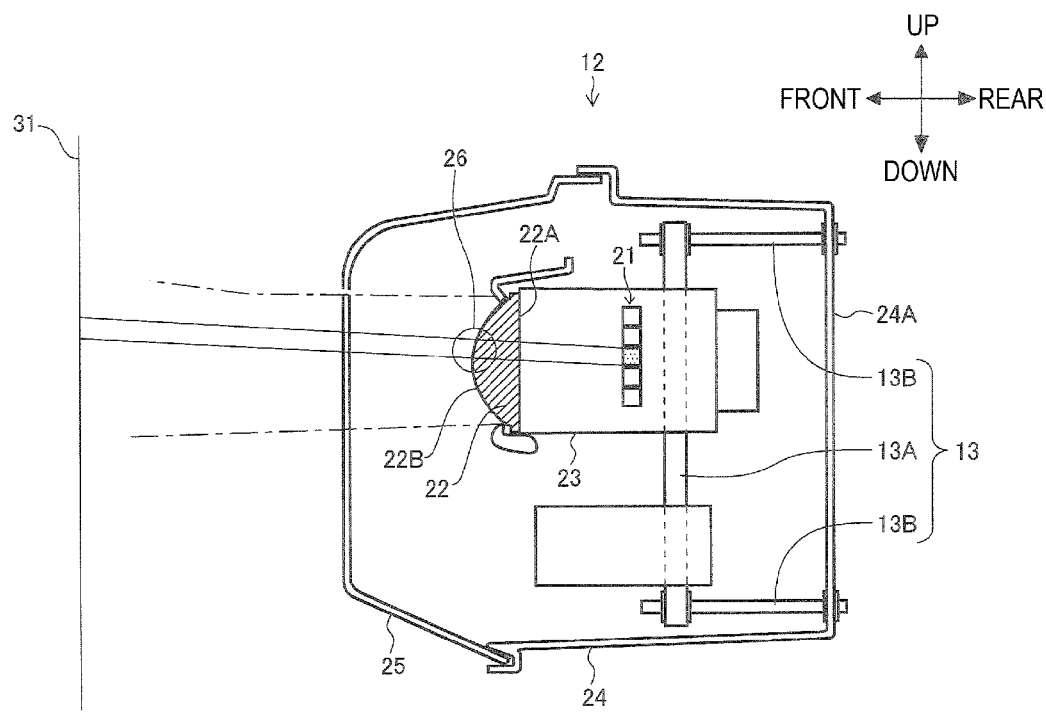
FIG. 2 is a cross-sectional view of the vehicle headlamp device according to the embodiment of the disclosure.
Figure 3:
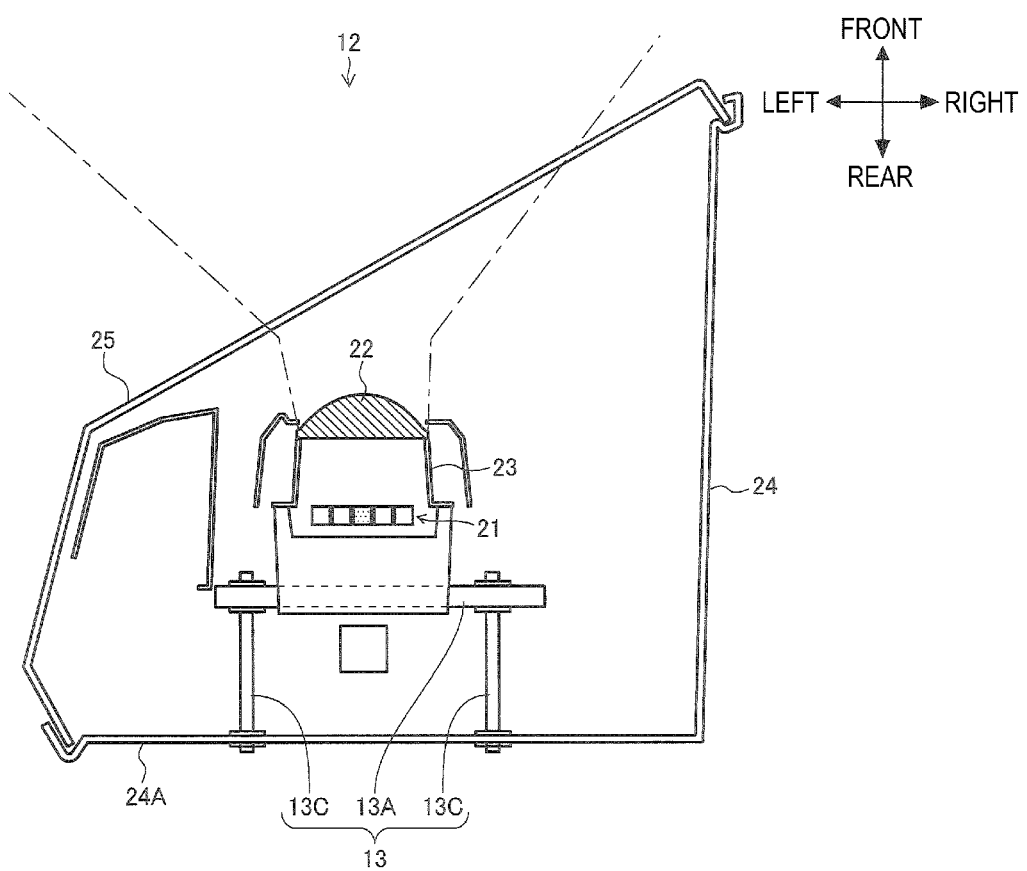
FIG. 3 is a cross-sectional view of the vehicle headlamp device according to the embodiment of the disclosure.

FIG. 1 is a block diagram illustrating the vehicle headlamp device 10 according to the present embodiment. FIG. 2 is a cross-sectional view of a headlamp unit 12 of the vehicle headlamp device 10 according to the present embodiment, taken along the height direction of the vehicle 11. FIG. 3 is a cross-sectional view of the headlamp unit 12 of the vehicle headlamp device 10 according to the present embodiment, taken along the vehicle width direction of the vehicle 11.

As illustrated in FIG. 1, the vehicle headlamp device 10 mainly includes the headlamp units 12 disposed at a front end of the vehicle 11, an optical axis adjustment unit 13 that is disposed in the headlamp units 12 and adjusts optical axes of the headlamp units 12, and a controller 14 that controls light sources 21 (see FIG. 2) of the headlamp units 12.

The controller 14 includes, for example, a central processing unit (CPU), a read only memory (ROM), a random access memory (RAM), and the like. The controller 14 is an electronic control unit (ECU) that executes various calculations and the like for controlling the vehicle headlamp device 10. A plurality of light distribution patterns that are emitted from the headlamp unit 12 are stored in advance in a storage unit of the controller 14. Examples of the stored light distribution patterns include a low-beam light distribution pattern 44 (see FIG. 5), a high-beam light distribution pattern 45 (see FIG. 5), and a light distribution pattern 43 for optical axis adjustment (see FIG. 5). The controller 14 may appropriately generate the light distribution patterns by the calculations. In one embodiment, the low-beam light distribution pattern 44 and the high-beam light distribution pattern 45 may serve as a first light distribution pattern, and the light distribution pattern 43 for optical axis adjustment may be referred to as a "second light distribution pattern".

The controller 14 controls the light source 21 (see FIG. 2), and causes all of a plurality of light emitting diodes serving as the light source 21 to emit light simultaneously or causes the plurality of light emitting diodes serving as the light source 21 to selectively emit light, according to the light distribution patterns. Light having a desired light distribution pattern is emitted from the headlamp unit 12 to illuminate an area ahead of the vehicle 11. The controller 14 can also adjust the brightness of the light emitting diodes according to the light distribution patterns.

As illustrated in FIGS. 2 and 3, the headlamp unit 12 mainly includes the light source 21, a lens 22, a housing 23 that supports the light source 21 and the lens 22, an outline member 24 that supports the optical axis adjustment unit 13, and a front cover 25 disposed on a front surface of the outline member 24.

As the light source 21, for example, the plurality of light emitting diodes (LEDs) are used, and the light emitting diodes are arranged in a matrix with respect to a circuit board (not illustrated). The circuit board is fixed at a desired position inside the housing 23, so that the light emitted from the light source 21 travels on a defined optical axis toward a front side of the vehicle 11 (see FIG. 1).

In the vehicle headlamp device 10 (see FIG. 1), the controller 14 selectively causes the plurality of light emitting diodes serving as the light source 21 to emit light, to thereby perform an adaptive driving beam (ADB) control. Then, under the control of the controller 14, all of the plurality of light emitting diodes are simultaneously selected to emit light or a part of the plurality of light emitting diodes are appropriately selected to emit light, according to the light distribution patterns.

The lens 22 is disposed in front of the light source 21, and closes a front opening of the housing 23. The lens 22 is, for example, a transparent resin lens. A surface of the lens 22 on the light source 21 side is a planar lens surface 22A, and a surface of the lens 22 on the opposite side is a convex lens surface 22B. With this structure, the light emitted from the light source 21 directly enters the lens 22 from the planar lens surface 22A, is diffused when passing through the convex lens surface 22B, and then illuminates an area ahead of the vehicle 11 as light having a desired light distribution pattern.

The housing 23 is, for example, made of a metal and has a cylindrical shape. The housing 23 opens on the front side of the vehicle 11. A vehicle rear side of the housing 23 is fixed at a desired position to a support plate 13A of the optical axis adjustment unit 13. Then, the housing 23 is movable integrally with the support plate 13A. The optical axis adjustment of the light emitted from the light source 21 is performed by finely adjusting an orientation of the support plate 13A.

The outline member 24 is, for example, formed by injection molding of a resin material, and constitutes an outline of the headlamp unit 12. Four main struts 13B and 13C of the optical axis adjustment unit 13 are assembled to the outline member 24, and the outline member 24 movably supports the optical axis adjustment unit 13. Then, the headlamp unit 12 is fixed to the vehicle 11 by assembling the outline member 24 to a vehicle body at the front end of the vehicle 11.

The front cover 25 is made of a transparent resin and is assembled so as to close the front surface of the outline member 24. The front cover 25 is processed into a desired shape according to a shape of the front end of the vehicle 11, and constitutes a design surface of the vehicle 11. The illumination light emitted from the light source 21 passes through the lens 22 and the front cover 25, and illuminates an area ahead of the vehicle 11.

As illustrated, the optical axis adjustment unit 13 mainly includes the support plate 13A that supports the housing 23, and the four main struts 13B and 13C that are fixed to the outline member 24 so as to be slidable in the front-rear direction of the vehicle 11. The main struts 13B and 13C each include, for example, a bolt and a nut, and are fixed to a rear end 24A of the outline member 24.

In each of the main struts 13B and 13C, a tip of the bolt advances to the front of the vehicle 11 when the nut is rotated in one direction, whereas the tip of the bolt retracts to the rear of the vehicle 11 when the nut is rotated in the opposite direction. As will be described in more detail later, in an optical axis adjustment process during vehicle manufacturing, an operator operates the nuts to tilt the support plate 13A in the front-rear direction and the vehicle width direction of the vehicle 11, so that an angle of the housing 23 is adjusted and the optical axis adjustment of the light emitted from the light source 21 is performed.

Figure 4:
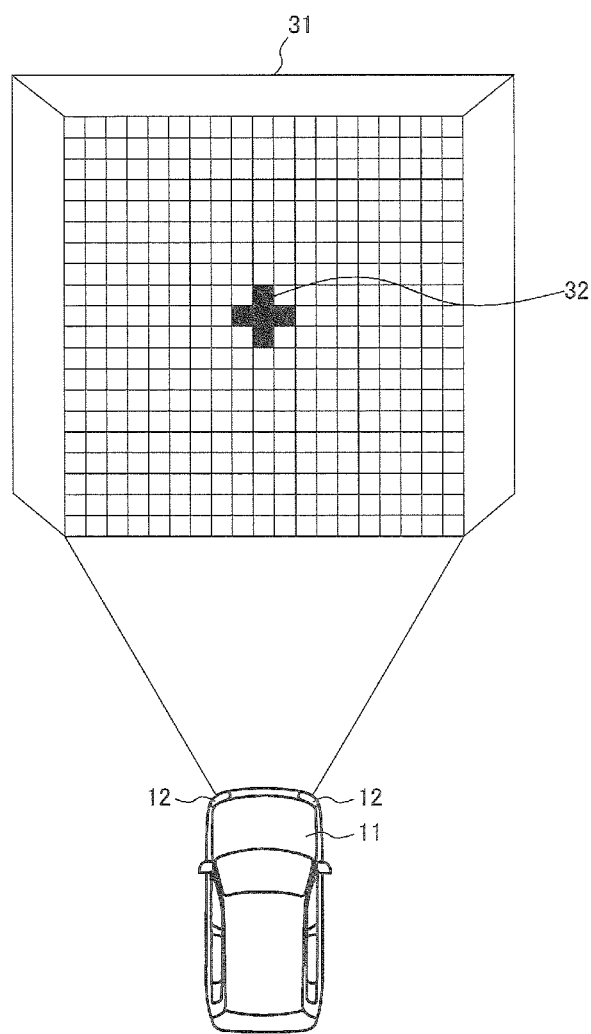
FIG. 4 is a schematic diagram illustrating an optical axis adjustment process of the vehicle headlamp device according to the embodiment of the disclosure.
Figure 5:
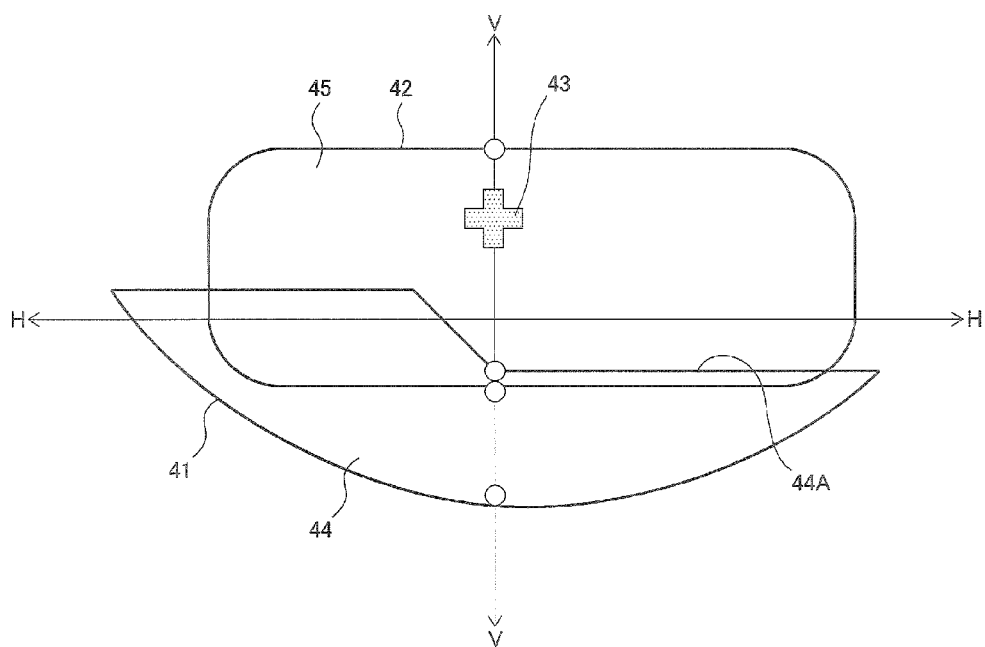
FIG. 5 is a diagram illustrating light distribution patterns of the vehicle headlamp device according to the embodiment of the disclosure.

FIG. 4 is a schematic diagram illustrating the optical axis adjustment process of the vehicle headlamp device 10 according to the present embodiment. FIG. 5 is a diagram illustrating the light distribution patterns of the vehicle headlamp device 10 according to the present embodiment.

FIG. 4 illustrates how to implement the optical axis adjustment process of the headlamp unit 12 in a manufacturing factory of the vehicle 11. As illustrated, an inspection screen 31 is fixed at a defined position with respect to a manufacturing line, and the optical axis adjustment of the headlamp unit 12 is performed with respect to the vehicle 11 that is conveyed on the manufacturing line.

The vehicle 11 is in front of the inspection screen 31 and is stopped at an inspection position of the manufacturing line. The operator performs various settings for the vehicle 11 based on inspection conditions for the optical axis adjustment, and couples an optical axis diagnostic apparatus (not illustrated) to the controller 14. The optical axis diagnostic apparatus controls the light sources 21 (see FIG. 2) via the controller 14, and causes the plurality of light emitting diodes constituting the light sources 21 to selectively emit light based on the light distribution pattern 43 for optical axis adjustment (see FIG. 5). The operator checks marking light 32 for optical axis adjustment which is projected on the inspection screen 31, and performs the optical axis adjustment such that the marking light 32 matches a target (not illustrated) on the inspection screen 31.

Here, in the present embodiment, the light distribution pattern 43 for optical axis adjustment is, for example, a cross-shaped light distribution pattern. As illustrated, the plurality of light emitting diodes constituting the light source 21 are arranged in a grid pattern. The controller 14 selects four light emitting diodes from the plurality of light emitting diodes and causes the selected light emitting diodes to emit light, so that the cross-shaped marking light 32 is projected on the inspection screen 31.

As described above, while checking the marking light 32 projected on the inspection screen 31, the operator operates the main struts 13B and 13C of the optical axis adjustment unit 13 (see FIG. 2) to tilt the support plate 13A in the front-rear direction or the vehicle width direction of the vehicle 11, so that the angle of the housing 23 is adjusted, and the optical axis of the light emitted from the light source 21 is adjusted.

The light distribution pattern 43 for optical axis adjustment is not limited to the cross shape, but may have, for example, a rectangular shape or a square shape. The design of the light distribution pattern 43 for optical axis adjustment may be changed to any shape according to a combination of light emitting diodes.

In FIG. 5, a frame with a solid line 41 indicates an example of the low-beam light distribution pattern 44, and a frame with a solid line 42 indicates an example of the high-beam light distribution pattern 45. The cross-shaped light distribution pattern 43 for optical axis adjustment is formed in the high-beam light distribution pattern 45. The light distribution pattern 43 for optical axis adjustment also may be provided in, for example, the low-beam light distribution pattern 44.

Since the vehicle headlamp device 10 according to the present embodiment forms the light distribution pattern 43 for optical axis adjustment using a part of the light sources 21 for the high-beam light distribution pattern 45, it is not necessary to highlight a light-dark boundary of a cut-off line 44A of the low-beam light distribution pattern 44. That is, in the low-beam light distribution pattern 44, the light-dark boundary around the cut-off line 44A can be set to a blurred state.

As a result, the light of the low-beam light distribution pattern 44 is emitted from the headlamp unit 12 during normal running of the vehicle 11, but the light at the cut-off line 44A and a neighboring region thereof is in an unclear state. Since a sudden change portion is reduced where brightness on a road surface is suddenly changed due to the light of the low-beam light distribution pattern 44, the driver is less likely to feel inconvenience caused by seeing the light-dark boundary too clearly due to the sudden change portion from the road surface while driving.

Further, immediately before the vehicle 11 reaches a climbing lane on a slope during the normal running, in particular, much of illumination light of the cut-off line 44A of the low-beam light distribution pattern 44 is projected on the road surface of the climbing lane, and the light-dark boundary is too clearly visible to the driver. However, as described above, in the present embodiment, the light at the cut-off line 44A and the neighboring region thereof is set to the unclear state. Thus, the driver is less likely to feel anxiety and inconvenience caused by seeing the light-dark boundary on the road surface ahead of the vehicle 11 too clearly.

In addition, it is not necessary to reduce a blurred region of the light of the low-beam light distribution pattern 44 too much, the illuminated region of the road surface during the normal running of the vehicle 11 is secured and the field of vision of the driver is secured, so that running safety of the vehicle 11 is improved.

Meanwhile, the light of the high-beam light distribution pattern 45 illuminates a space diagonally above the vehicle 11 during the normal running of the vehicle 11, and thus a less amount of light of the high-beam light distribution pattern 45 is projected on the road surface than that of the low-beam light distribution pattern 44. Even when the light-dark boundary of the light distribution pattern 43 for optical axis adjustment is clearly highlighted, a projection direction of the high beam prevents the light-dark boundary on the road surface in front of the vehicle 11 from being seen too clearly, and prevents the driver from feeling inconvenience.

As a result, the light-dark boundary of the light of the light distribution pattern 43 for optical axis adjustment that forms the marking light 32 is clearly highlighted, so that in the optical axis adjustment process of the headlamp unit 12, the operator can easily recognize the marking light 32 which is clearly projected on the inspection screen 31, which can improve the work efficiency of the optical axis adjustment and improve the accuracy of the optical axis adjustment.

In the present embodiment, as illustrated in FIG. 2, a region indicated by a circle 26 on the convex lens surface 22B of the lens 22 may be subjected to a transmission process for enabling the convex lens surface 22B to transmit the light of the light distribution pattern 43 for optical axis adjustment. In the case of this structure, when the light of the light distribution pattern 43 for optical axis adjustment passes through the region subjected to the transmission process, the light is transmitted without being diffused, the marking light 32 having the clearly highlighted light-dark boundary is projected on the inspection screen 31 (see FIG. 3). As a result, the operator can easily recognize the marking light 32 clearly projected on the inspection screen 31, which can improve the work efficiency of the optical axis adjustment and improve the accuracy of the optical axis adjustment. At this time, the region subjected to the transmission process is provided on the convex lens surface 22B of the region through which the light of the high-beam light distribution pattern 45 passes, which prevents the driver from feeling inconvenience during normal driving. Various other modifications and alterations may be made without departing from the gist of the disclosure.

In the vehicle headlamp device according to the embodiment of the disclosure, the second light distribution pattern for optical axis adjustment is different from the first light distribution pattern during the running of the vehicle. Thus, the light-dark boundary of the second light distribution pattern is highlighted, and the accuracy of the inspection is improved. Since the light-dark boundary of the first light distribution pattern is relaxed, a sudden change portion where illuminance on a road surface is suddenly changed does not occur when low-beam is turned on, so that the inconvenience for the driver is eliminated.

The invention claimed is:

1. A vehicle headlamp device to be applied to a vehicle, the vehicle headlamp device comprising:
    a light source configured to emit light, the light source including light emitting diodes;
    a lens through which the light is to pass; and
    a controller configured to control light distribution patterns for the light by selectively emitting the light emitting diodes,
    wherein the light distribution patterns include a high-beam light distribution pattern, a low-beam light distribution pattern and an adjustment light distribution pattern,
    wherein the controller is configured to:
        cause a first predetermined part of the light emitting diodes to emit light so that the light emitted from the light source illuminates a first area when the high-beam light distribution pattern is selected from the light distribution patterns;
        cause a second predetermined part of the light emitting diodes to emit light so that the light emitted from the light source illuminates a second area when the low-beam light distribution pattern is selected from the light distribution patterns; and
        cause a third predetermined part of the light emitting diodes to emit light so that the light emitted from the light source illuminates a third area when the adjustment light distribution pattern is selected from the light distribution patterns, and
    wherein the third area has a predetermined shape that is smaller than the first area and is located within the first area and is located outside the second area.

2. The vehicle headlamp device according to claim 1, wherein the lens comprises a planar lens surface and a convex lens surface, the planar lens surface being located closer to the light source than the convex lens surface, and
    wherein a light transmission process is applied to a region of the convex lens surface through which a light emitted from the third predetermined part of the light emitting diodes passes, the light transmission process transmits the light without diffusing.

3. The vehicle headlamp device according to claim 2, wherein the light emitting diodes are located on a circuit board.

4. The vehicle headlamp device according to claim 3, wherein the light emitting diodes are arranged in a grid pattern.

5. The vehicle headlamp device according to claim 4, wherein the third portion of the light emitting diodes consists of light emitting diodes located within a cross shaped region on the circuit board.

6. The vehicle headlamp device according to claim 1, wherein the light emitting diodes are located on a circuit board.

7. The vehicle headlamp device according to claim 6, wherein the light emitting diodes are arranged in a grid pattern.

8. The vehicle headlamp device according to claim 7, wherein the third portion of the light emitting diodes consists of light emitting diodes located within a cross shaped region on the circuit board.

* * * * *